(12) United States Patent
Tseng et al.

(10) Patent No.: US 7,463,911 B2
(45) Date of Patent: Dec. 9, 2008

(54) COMMUNICATION DEVICE

(75) Inventors: Steven Tseng, Taipei (TW); Yang An Ping, Shanghai (CN)

(73) Assignee: Inventec Appliances Corporation, Taipei Hsieng (TW)

( * ) Notice: Subject to any disclaimer, the term of this patent is extended or adjusted under 35 U.S.C. 154(b) by 777 days.

(21) Appl. No.: 10/964,620

(22) Filed: Oct. 15, 2004

(65) Prior Publication Data

US 2006/0084481 A1    Apr. 20, 2006

(51) Int. Cl.
    *H04Q 7/32* (2006.01)
(52) U.S. Cl. .............. 455/575.1; 455/572; 455/550.1; 455/575.4; 455/90.3; 320/114; 379/433.01; 379/433.08; 379/433.12
(58) Field of Classification Search ......... 455/575.1, 455/571–574, 74, 575.4, 90.1, 90.2, 90.3, 455/422.1, 500, 550.1, 517, 73, 80.1; 379/433.01, 379/433.12, 440, 433.08, 428.01; 320/114; 429/96, 97
See application file for complete search history.

(56) References Cited

U.S. PATENT DOCUMENTS

| 5,140,138 | A  | * | 8/1992  | Tanaka ................... 235/1 D |
| 6,302,454 | B1 | * | 10/2001 | Tsurumaru et al. ......... 292/175 |
| 6,730,432 | B1 | * | 5/2004  | Grosfeld et al. ............. 429/97 |
| 7,089,291 | B1 | * | 8/2006  | Philyaw ..................... 709/217 |

FOREIGN PATENT DOCUMENTS

JP          07142044 A  *  6/1995

* cited by examiner

*Primary Examiner*—Keith T Ferguson
(74) *Attorney, Agent, or Firm*—Birch, Stewart, Kolasch & Birch, LLP

(57) ABSTRACT

A communication device. The communication device comprises a body, a battery unit and an ejecting device. The body comprises an opening, a first port, a first positioning portion and a receptacle. The opening is formed on one end of the body, and the receptacle is a hollow rectangular space connecting the opening and the body. The first port is an electrical contact disposed in the body connected to a circuit board installed therein. The first positioning portion is a recess or hole formed on the sidewall of the receptacle near the opening.

20 Claims, 9 Drawing Sheets

COMMUNICATION DEVICE

BACKGROUND

The present invention relates to a communication device, and in particular to a communication device providing a removable battery unit flattening the profile of a rear surface thereof.

FIGS. 1A, 1B and 2A, 2B are perspective views of two conventional mobile phones P1 and P2.

In FIG. 1A, the mobile phone P1 comprises a body M1, a cover M2 and a battery C1 having an electrical contact Q1. The battery C1 is integrally formed with the cover M2. A switch K21, two positioning holes K22 and an electrical contact Q2 are formed on the body M1. Three engaging portions K11, K12 and K12, corresponding to the switch K21 and two positioning holes K22 and K22, are integrally formed on the cover M2. As the engaging portions K12 of the cover M2 connect to the positioning holes K22 of the body M1, the switch K21 locks the engaging portions K11 of the cover M2, and the electrical contact Q1 of the battery C1 makes contact with the electrical contact Q2 of the body M1.

In FIG. 1B, a button B1 disposed on the cover M2 is connected to the engaging portions K11. When the button B1 is pressed to disconnect the engaging portion K11 and the switch K21, the cover M2 can be removed from the body M1.

In FIG. 2A, the mobile phone P2 comprises a body N1, a cover N2 and a battery C2 having an electrical contact R2. Three engaging portions H11, H12 and H12 are formed on the cover N2. A switch H21, a button B2, two positioning holes H22, H22 and an electrical contact R1 are formed on the body N1, corresponding to the engaging portions H11, H12 and H12 of the cover N2 and the electrical contact R2 of the battery C2.

Connection of the electrical contacts R2 and R1 is achieved by inserting the battery C2 into the body N1. The battery C2 is housed between the cover N2 and the body N1 by aligning the engaging portions H11, H12 and H12 of the cover N2 to connect to the switch H21, the positioning holes H22 and H22, respectively. The cover N2 is removed from the body N1 by pressing the button B2, thereby disengaging the engaging portion H11 from the switch H21.

The design of the button B1 and switch K21 on the rear of the mobile phone P1 as well as the button B2 and switch H11 on the rear of the mobile phone P2, however, leave the rear surface of the mobile phone uneven.

SUMMARY

The communication device of embodiments of the invention comprises a body, a battery unit and an ejecting device. The body is a host of the communication device, comprising an opening, a first port, a first positioning portion and a receptacle. The opening is formed on one end of the body, and the receptacle is a hollow rectangular space connecting the opening and the body. The first port is an electrical contact disposed in the body connected to a circuit board installed therein. The first positioning portion is a recess or hole formed on the sidewall of the receptacle near the opening. Thus, a flat profile is achieved on a rear surface of the communication device.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION

Figure 1A:
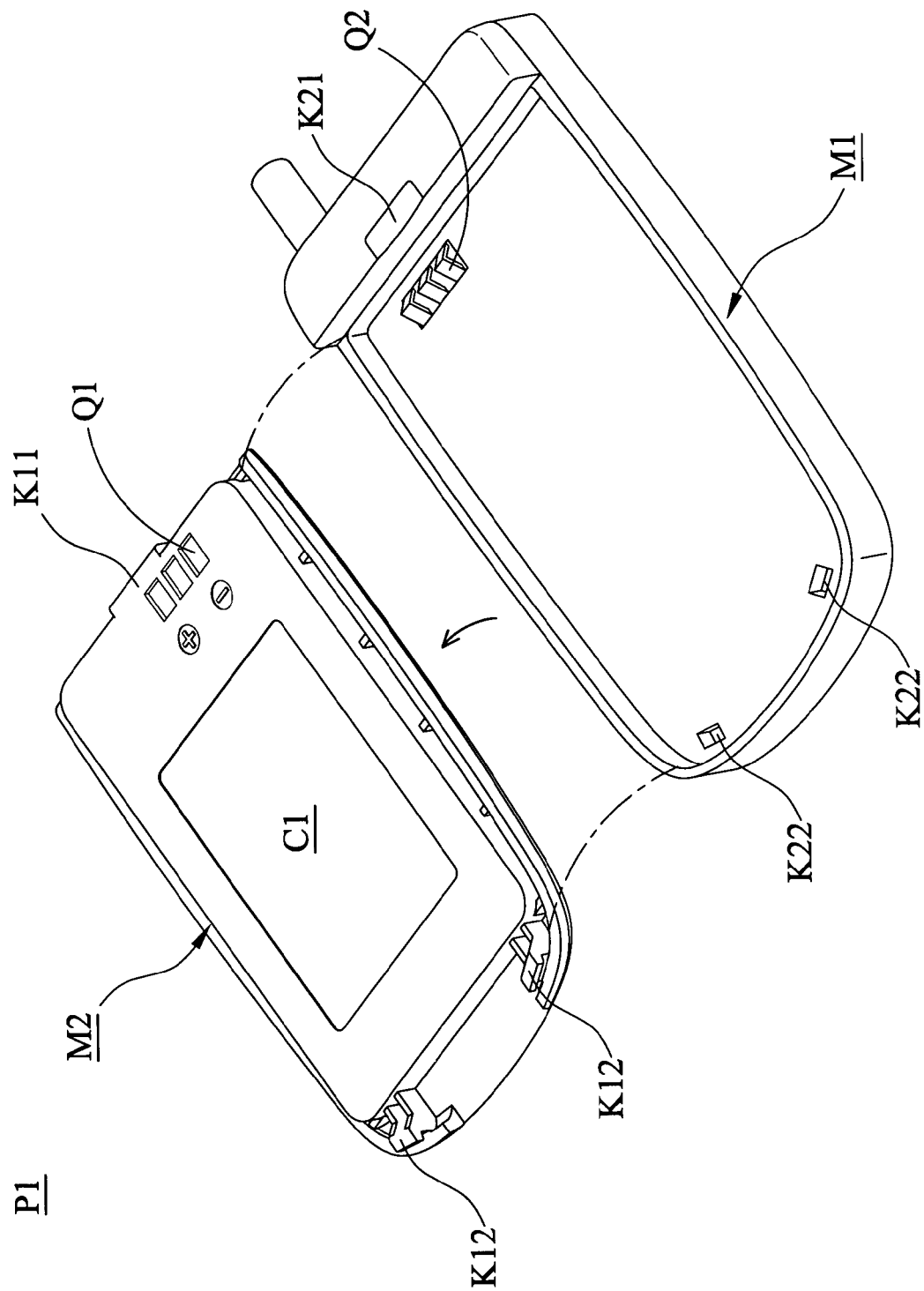
FIG. 1A is an exploded perspective view of a conventional mobile phone (P1)
Figure 1B:
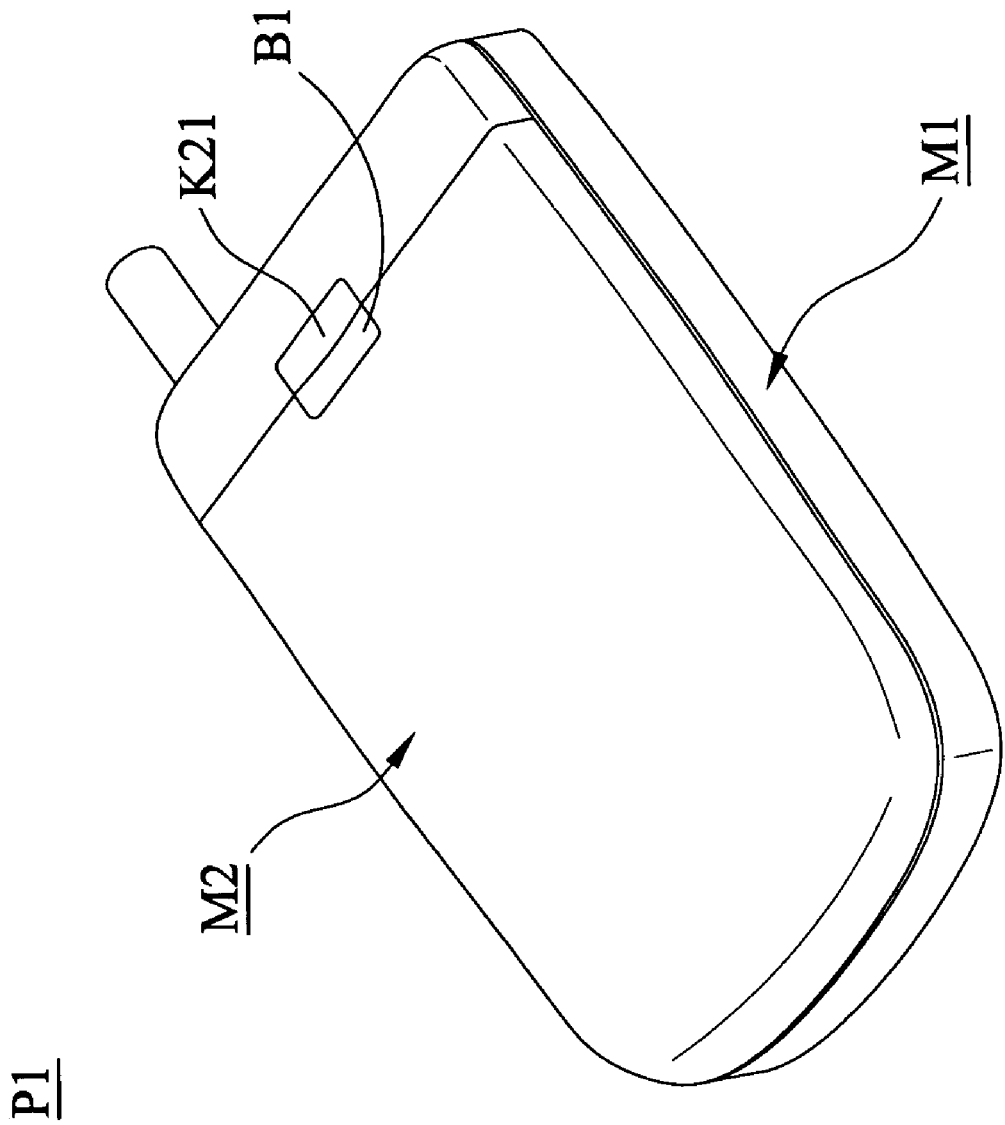
FIG. 1B is an assembled perspective view of the mobile phone (P1) of FIG. 1A.
Figure 2A:
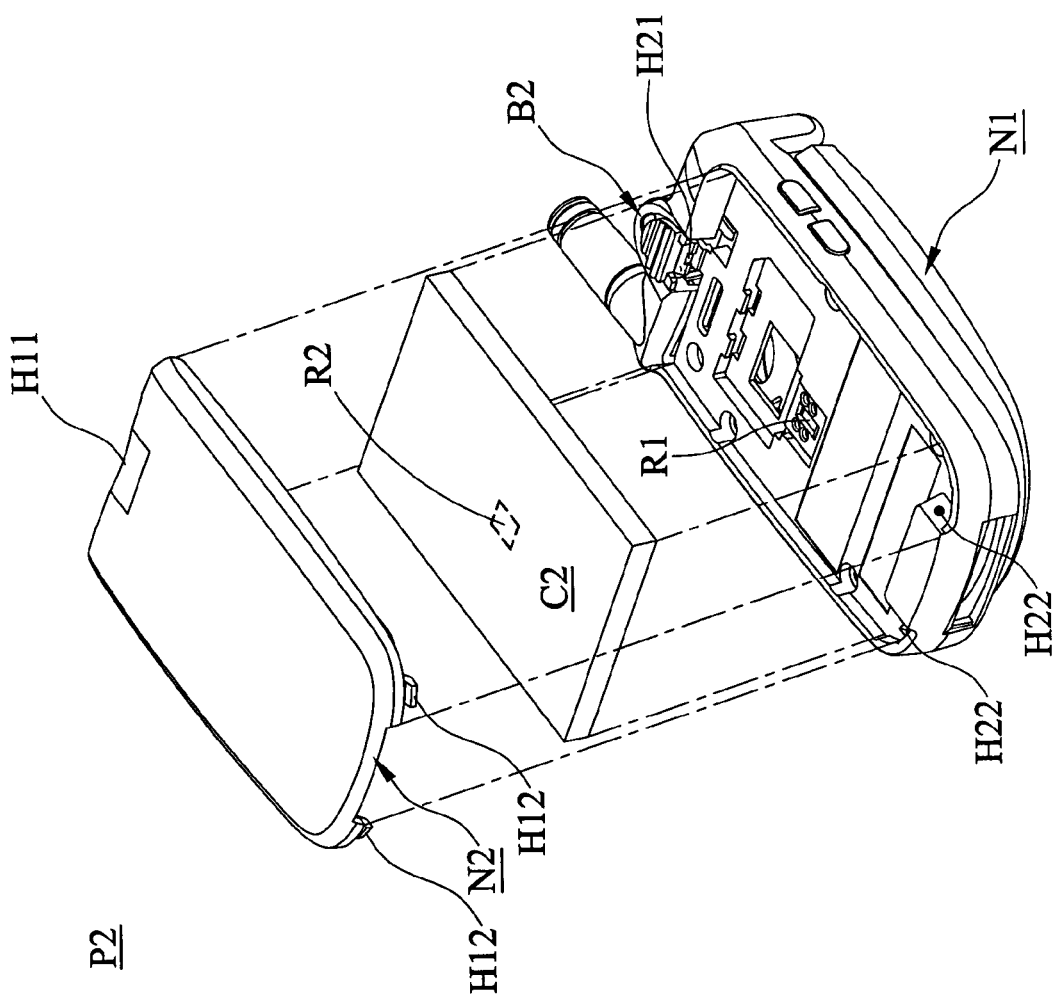
FIG. 2A is an exploded perspective view of a conventional mobile phone (P2)
Figure 2B:
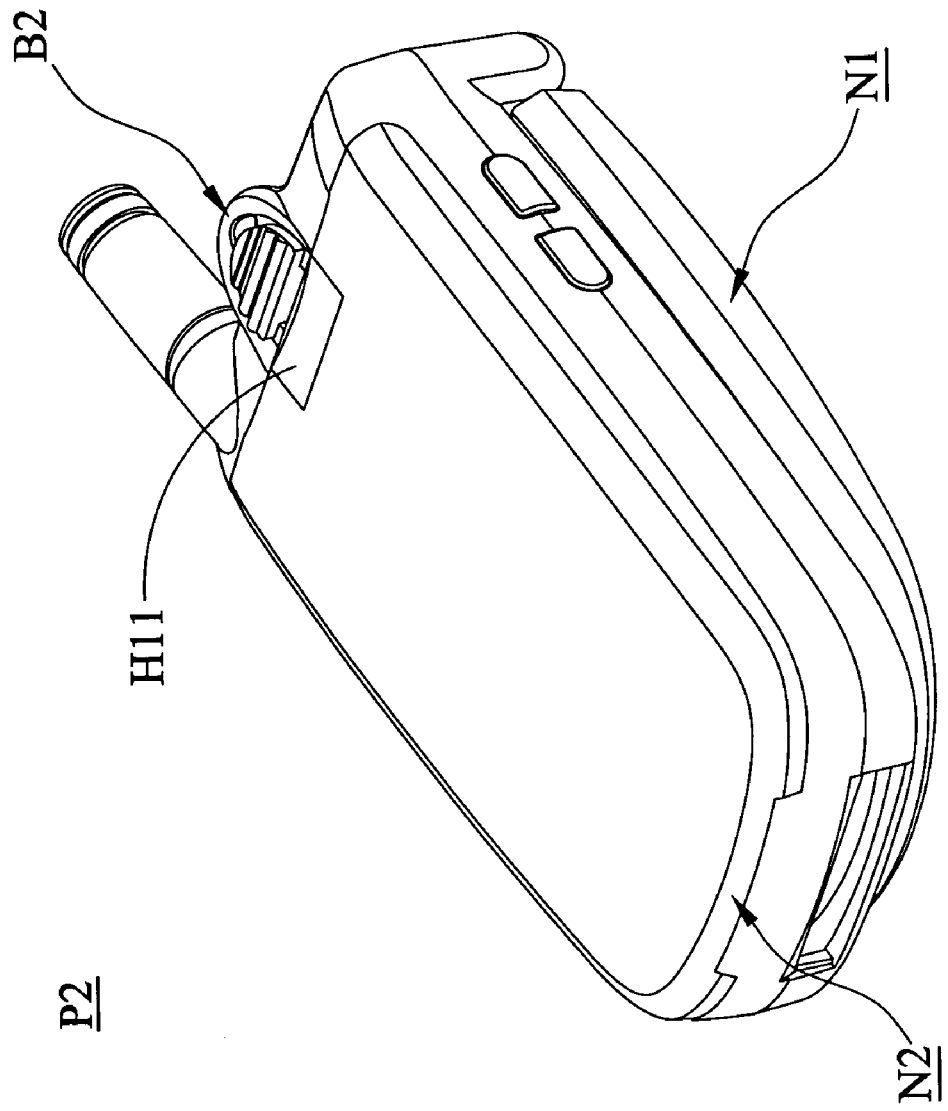
FIG. 2B is an assembled perspective view of the mobile phone (P2) of FIG. 2A.
Figure 3A:
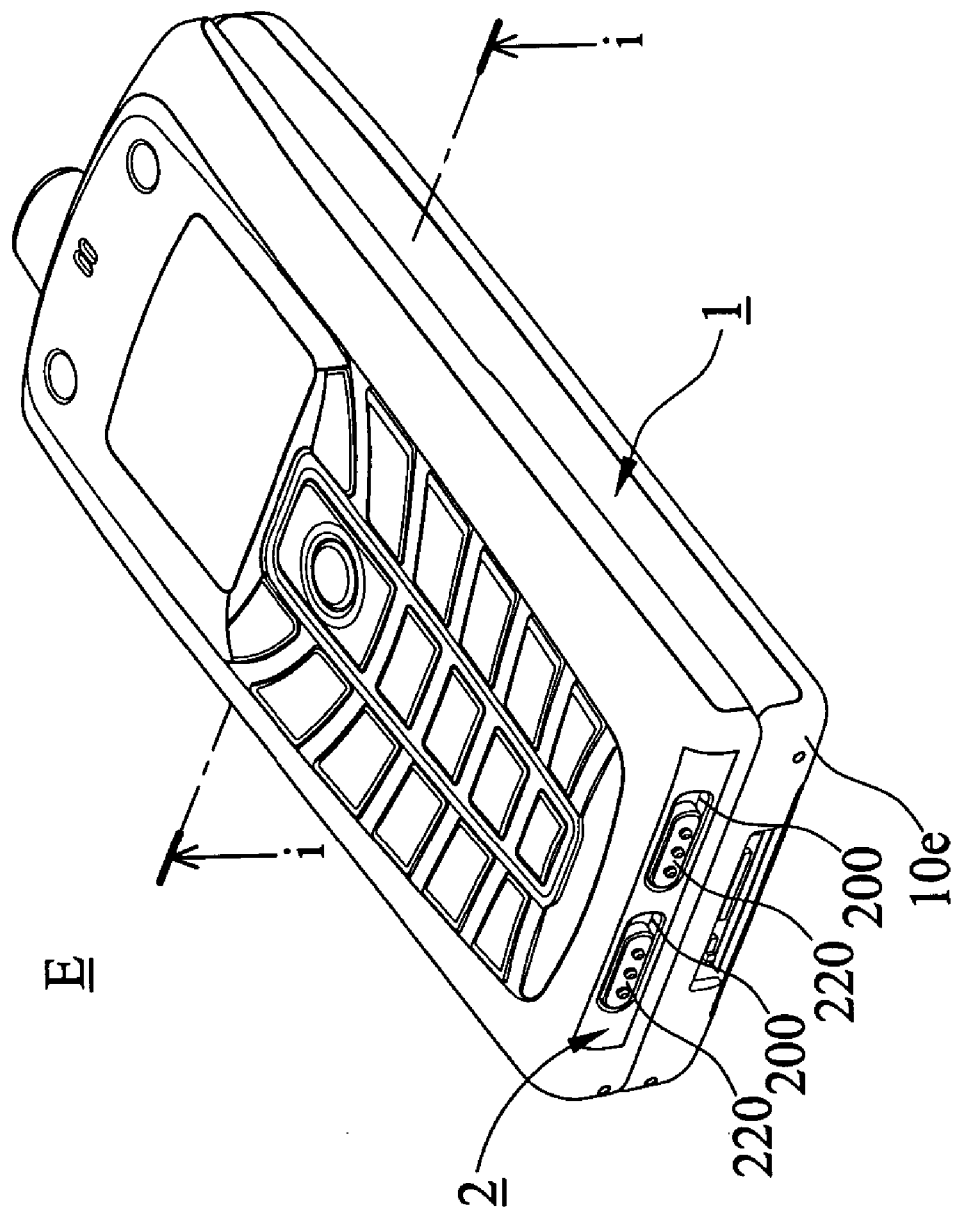
FIG. 3A is a perspective view of a communication device (E) of an embodiment of the invention, wherein a battery unit (2) is embedded in a body (1)
Figure 3B:
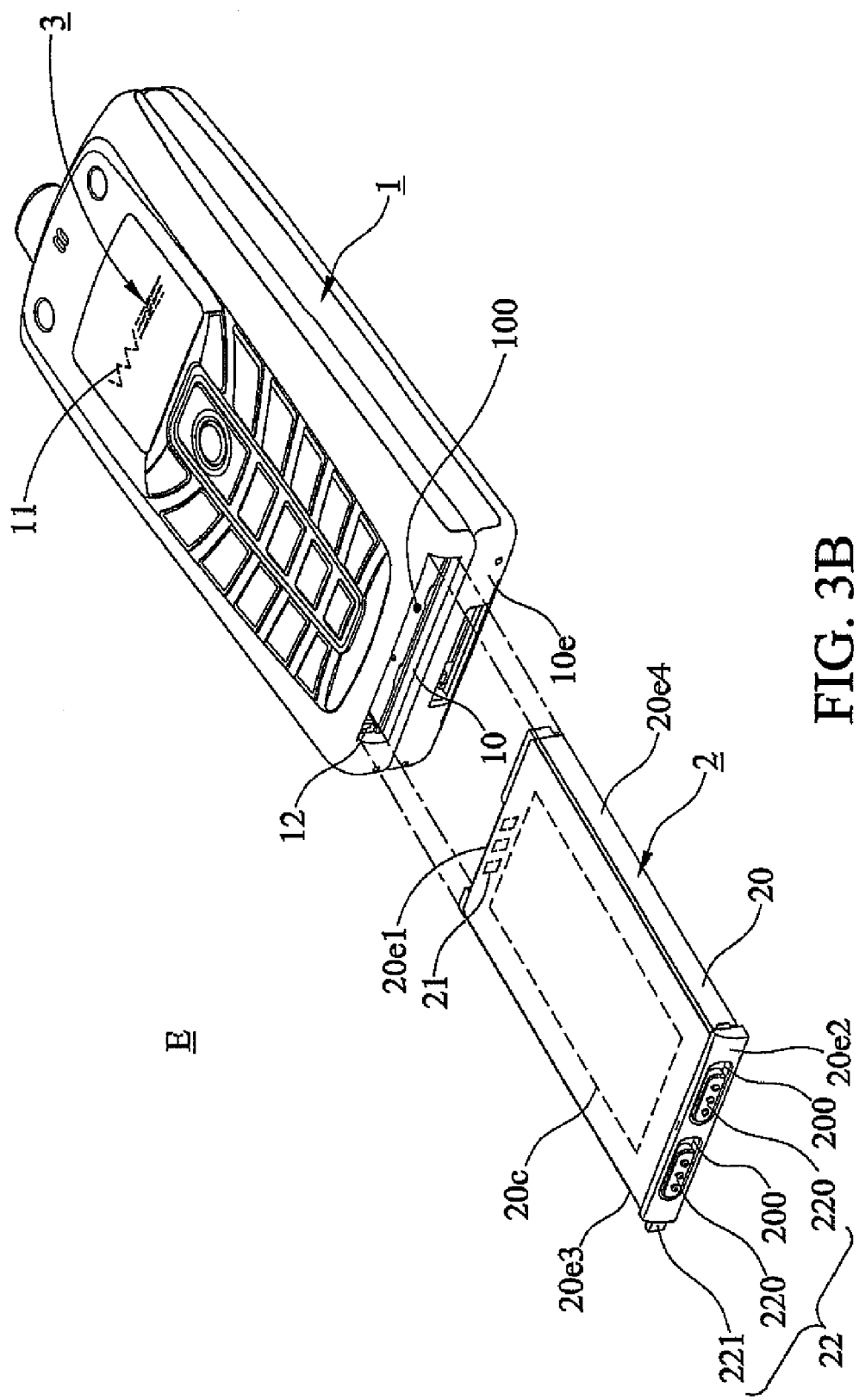
FIG. 3B is an exploded perspective view of the communication device (E) of FIG. 3A, wherein the battery unit (2) is separated from the body (1)

A communication device E of an embodiment of the invention is an electronic device such as mobile phone or Personal Digital Assistant (PDA). FIGS. 3A and 3B are perspective views of an embodiment of the communication device E of the invention. FIG. 3A shows a battery unit 2 disposed in a body 1. FIG. 3B shows the battery unit 2 separated from the body 1.

In FIG. 3B, the communication device E comprises a body 1, a battery unit 2 and an ejecting device 3. The body 1 is a host of the communication device E, comprising an opening 10, a first port 11, a first positioning portion 12 and a receptacle 100. The opening 10 is formed on one end 10e of the body 1, and the receptacle 100 is a hollow rectangular space in the body 1 connecting the opening 10. The first port 11 is an electrical contact disposed in the body 1 and connected to a circuit board (not shown) installed in the body 1. The first positioning portion 12 is a recess or hole formed on the sidewall of the receptacle 100 near the opening 10.

Figure 4B:
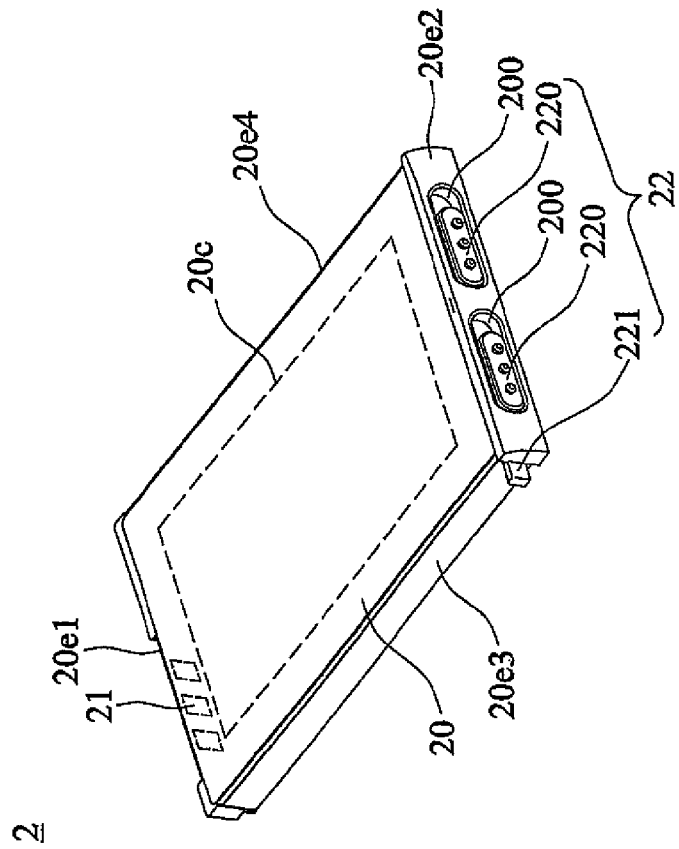
FIG. 4B is a perspective view of the battery unit (2) of FIG. 4A.
Figure 4A:
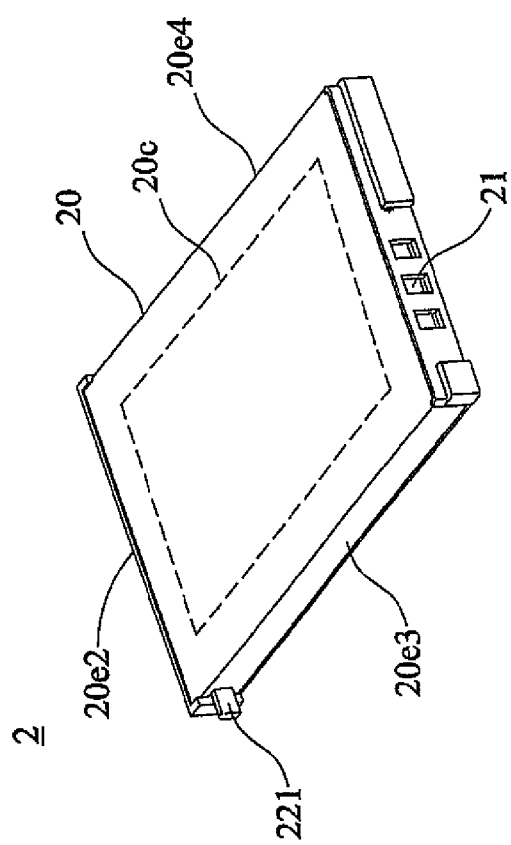
FIG. 4A is a perspective view of the battery unit (2) of FIG. 3B.

FIGS. 4A and 4B are two perspective views of the battery unit 2 of FIG. 3B. The battery unit 2 comprises a case 20, a cell 20c, a second port 21 and a second positioning portion 22. The cell 20c is received in the rectangular case 20 for power storage. The rectangular case 20 has two guiding portions 200 and four sides 20e1, 20e2, 20e3 and 20e4. The second port 21 is an electrical contact disposed on the side 20e1 of the case 20 and connecting the cell 20c, and two guiding portions 200 formed as spaced slots on the side 20e2, respectively. The second positioning portion 22 is a bar-like element movably disposed on the side 20e2, having two protrusions 220 and a rod 221. The protrusions 220 are exposed on an outer surface of the side 20e2 of the case 20. The longitudinal direction of the rod 221 is substantially parallel to the side 20e2, and the protrusions 220 integrally formed on the rod 221 are movably received in the guiding portions 200, respectively.

Figure 5A:
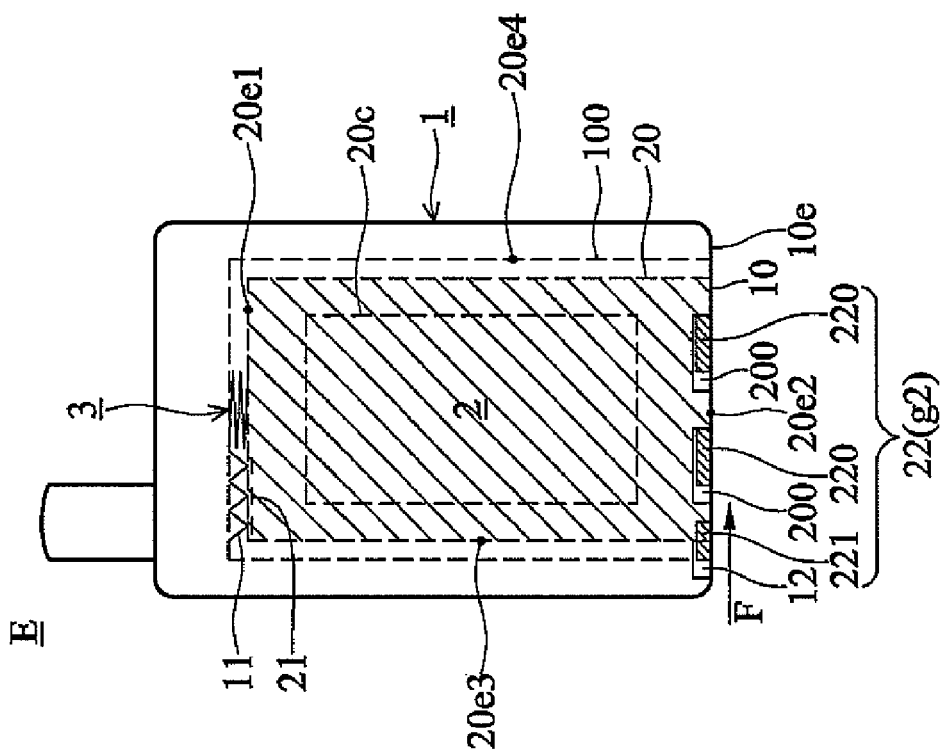
FIG. 5A is a partially sectional view of the communication device (E) of FIG. 3A along line (i-i), wherein the battery unit (2) is locked in the body (1)
Figure 5B:
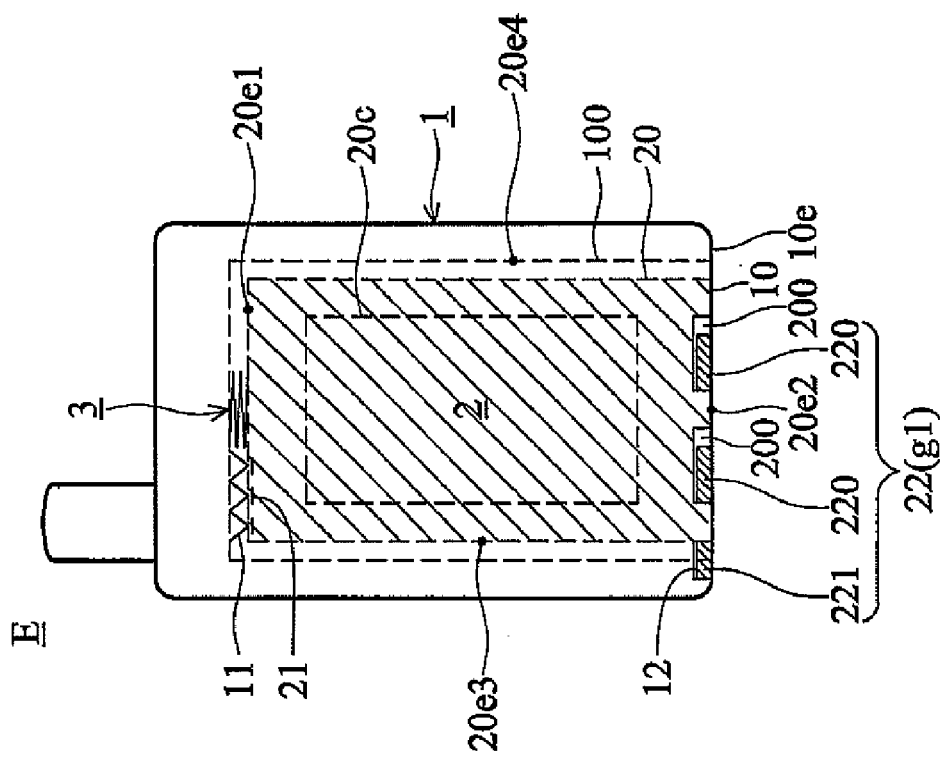
FIG. 5B is a plane view of the communication device (E) of FIG. 5A, prior to ejection of the battery unit (2) from the body (1)
Figure 5C:
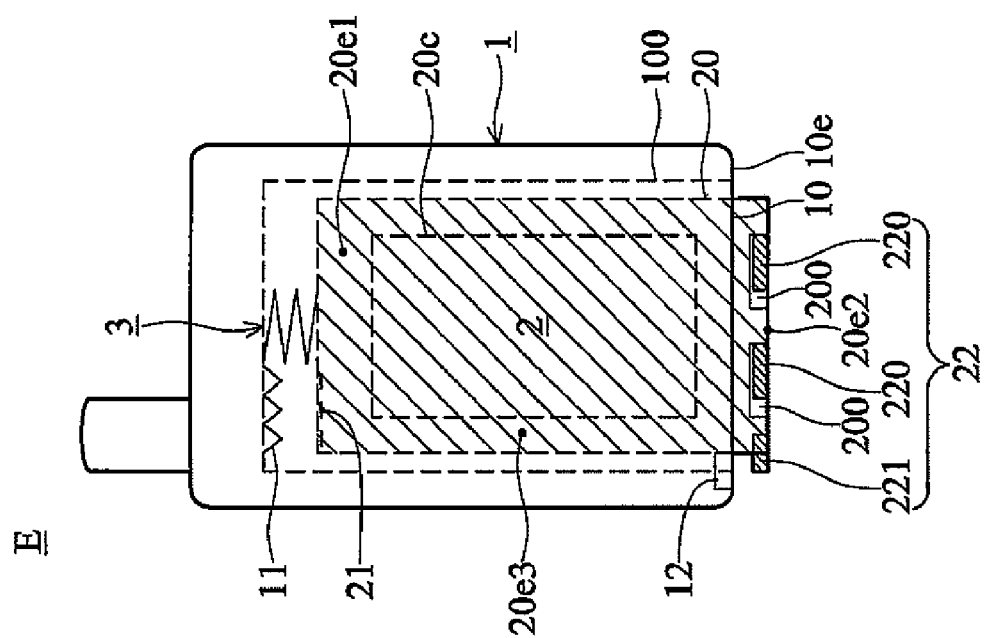
FIG. 5C is a plane view of the communication device (E) of FIG. 5A, wherein the ejected battery unit (2) is electrically disconnected from the body (1).

FIGS. 5A-5C are partial sectional views of the communication device E of FIG. 3A along line i-i. FIG. 5A shows the battery unit 2 disposed in the body 1 secured by the second positioning portion 22. FIG. 5B shows the battery unit 2 prior to ejection from the body 1, and the battery unit 2 in FIG. 5C is ejected and electrically disconnect from the body 1. The guiding portion 200, guides the second positioning portion 22 as it moves between a first position (reference number "g1" shown in FIG. 5A) to secure the battery unit 2 in the body 1 and a second position (reference number "g2" shown in FIG. 5B) for removing the battery unit 2 from the body 1 with respect to the cell 20c.

The ejecting device 3 is disposed on the sidewall of the receptacle 100 of the body 1. In this embodiment, the ejecting device 3 is a spring. The site of the first port 11 disposed on the sidewall of the receptacle 100 corresponds to the second port 21 of the battery unit 2. In other embodiments, the ejecting device 3 can also be installed on the battery unit 2, but not shown in the FIGS.

FIG. 5A shows the battery unit 2 received in the receptacle 100 fully inserted and the rod 221 of the second positioning portion 22 has moved to insert the first positioning portion 12. The battery unit 2 is secured in the body 1, the ejecting device 3 between the body 1 and the battery unit 2 is compressed and the second port 21 of the battery unit 2 connects the first port 11, electrically connecting the battery unit 2 to the body 1.

In FIG. 5B, as the battery unit 2 received in the receptacle 100 is still fully inserted and the rod 221 of the second positioning portion 22 is removed from the first positioning portion 12 along direction F, i.e., the battery unit 2 is unlocked in the body 1, the compressed ejecting device 3 between the body 1 and the battery unit 2 is released generating a force pushing the ejecting device 3 out of the receptacle 100.

As the force of the ejecting device 3 is completely released shown in FIG. 5C, the battery unit 2 is pushed out of the receptacle 100 and partially extends from the body 1. Thus, the battery unit 2 is electrically disconnected from the body 1.

While the invention has been described in connection with what is presently considered to be the most practical and preferred embodiment, it is to be understood that the invention is not limited to the disclosed embodiments, but, on the contrary, is intended to accommodate various modifications and equivalent arrangements included within the spirit and scope of the appended claims.

What is claimed is:

1. A communication device, comprising:
    a body having an opening and a first positioning portion; and
    a battery unit received in the body via the opening, comprising a cell for connecting to the body and a second positioning portion moved between a first position and a second position with respect to the cell; when the second positioning portion of the battery unit moves to the first position to connect the first positioning portion of the body, the battery unit is locked in the body; when the second positioning portion of the battery unit moves to the second position from the first position to disconnect the first positioning portion of the body, the battery unit is unlocked in the body.

2. The communication device as claimed in claim 1, wherein the battery unit further comprises a case and the second positioning portion is movably disposed on the case.

3. The communication device as claimed in claim 1, further comprising an ejecting device disposed between the body and the battery unit.

4. The communication device as claimed in claim 3, wherein the ejecting device is disposed on the body.

5. The communication device as claimed in claim 3, wherein the ejecting device comprises a spring.

6. The communication device as claimed in claim 1, further comprising an ejecting device disposed on the body with respect to the battery unit.

7. The communication device as claimed in claim 6, wherein the ejecting device comprises a spring.

8. The communication device as claimed in claim 1, wherein the communication device comprises a mobile phone.

9. A communication device, comprising:
    a body having an opening, a first port and a first positioning portion; and
    a battery unit received in the body via the opening, comprising a cell for connecting to the body, a second port connected to the cell and a second positioning portion moved between a first position and a second position with respect to the cell; when the second positioning portion of the battery unit moves to the first position to connect the first positioning portion of the body, the battery unit is locked in the body, and the second port of the battery unit connects the first port of the body; when the second positioning portion of the battery unit moves to the second position from the first position to disconnect the first positioning portion of the body, and the second port of the battery unit disconnects the first port of the body.

10. The communication device as claimed in claim 9, wherein the battery unit further comprises a case and the second positioning portion is movably disposed on the case.

11. The communication device as claimed in claim 9, further comprising an ejecting device disposed between the body and the battery unit.

12. The communication device as claimed in claim 11, wherein the ejecting device is disposed on the body.

13. The communication device as claimed in claim 11, wherein the ejecting device comprises a spring.

14. The communication device as claimed in claim 9, further comprising an ejecting device disposed on the body with respect to the battery unit.

15. The communication device as claimed in claim 14, wherein the ejecting device comprises a spring.

16. The communication device as claimed in claim 9, wherein the communication device comprises a mobile phone.

17. A communication device, comprising:
    a body having an opening and a first positioning portion;
    a battery unit received in the body via the opening, comprising a case having an outer surface, a cell for connecting to the body, and a second positioning portion moved between a first position and a second position to be disposed on disposed on the case, wherein the second positioning portion comprises a protrusion exposes on the outer surface of the case; when the second positioning portion moves to the first position to connect the first positioning portion, the battery unit is locked in the body; when the second positioning portion moves to the second position from the first position to disconnect the first positioning portion, the battery unit is unlocked in the body.

18. The communication device as claimed in claim 17, wherein the case further comprises a guiding portion to receive the protrusion.

19. A communication device, comprising:

a body having an opening, a first port and a first positioning portion; and a battery unit received in the body via the opening, comprising a case having an outer surface, a cell for connecting to the body, a second port connected to the cell, and a second positioning portion moved between a first position and a second position to be disposed on disposed on the case, wherein the second positioning portion comprises a protrusion exposes on an outer surface of the case; when the second positioning portion moves to the first position to connect the first positioning portion, the battery unit is locked in the body, and the second port of the battery unit connects the first port of the body; when the second positioning portion moves to the second position from the first position to disconnect the first positioning portion, and the second port of the battery unit disconnects the first port of the body.

20. The communication device as claimed in claim 19, wherein the case further comprises a guiding portion to receive the protrusion.

* * * * *